Nov. 15, 1966  R. R. BATCHER  3,286,017
MULTIPLE CONDUCTOR CABLE AND METHOD OF MAKING IT
Filed March 3, 1964
3 Sheets-Sheet 1
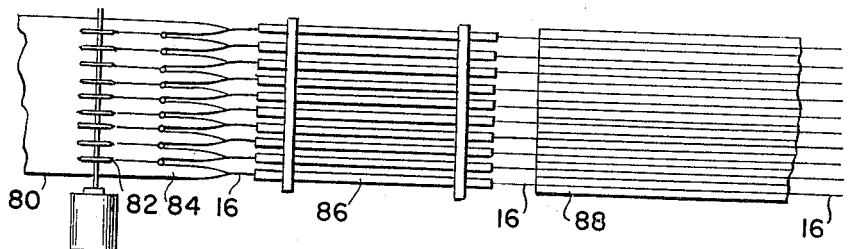
FIG.8
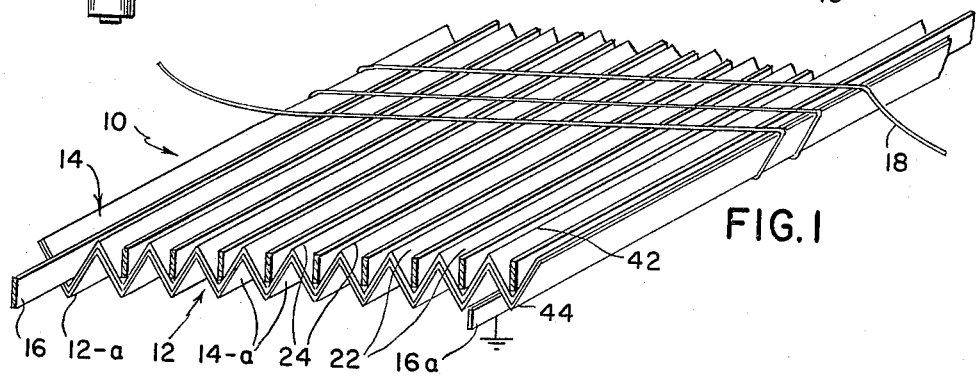
FIG.1
FIG.2a
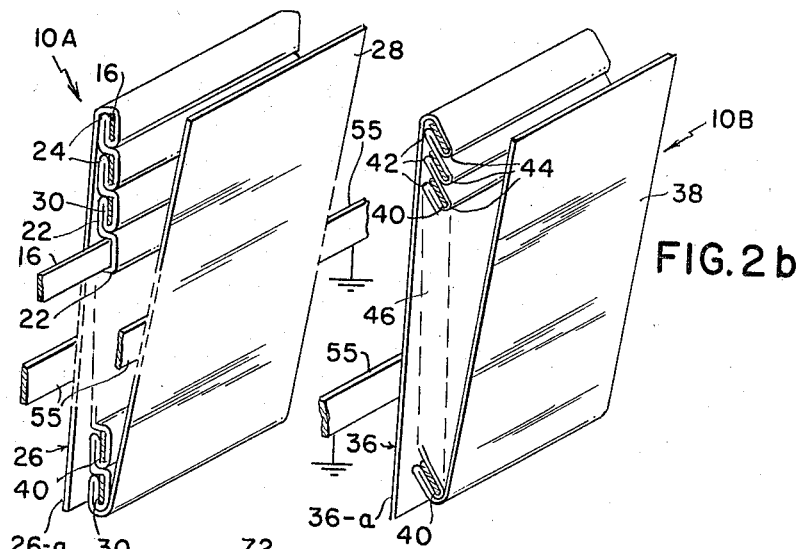
FIG.2b
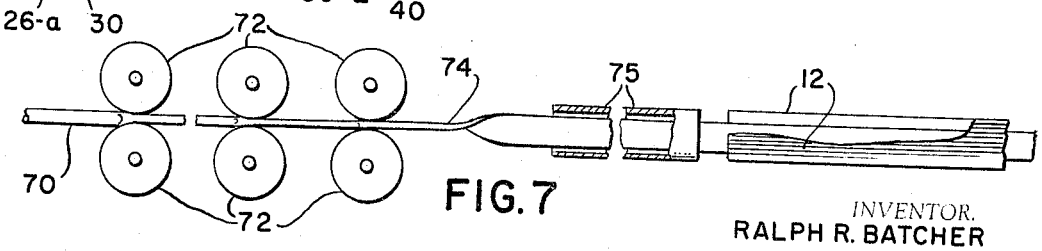
FIG.7
INVENTOR.
RALPH R. BATCHER
BY
ATTORNEY Nov. 15, 1966  R. R. BATCHER  3,286,017
MULTIPLE CONDUCTOR CABLE AND METHOD OF MAKING IT
Filed March 3, 1964  3 Sheets-Sheet 2
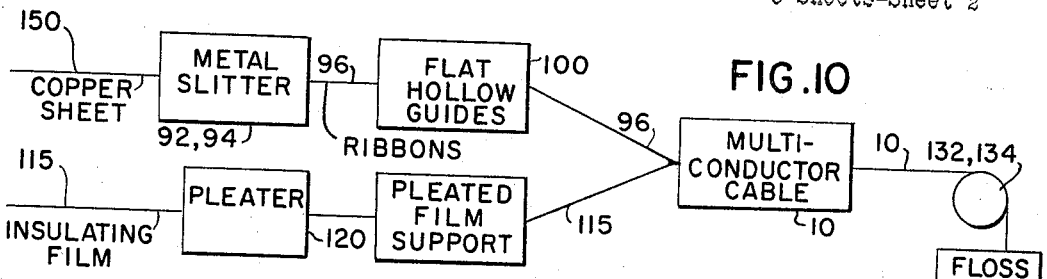
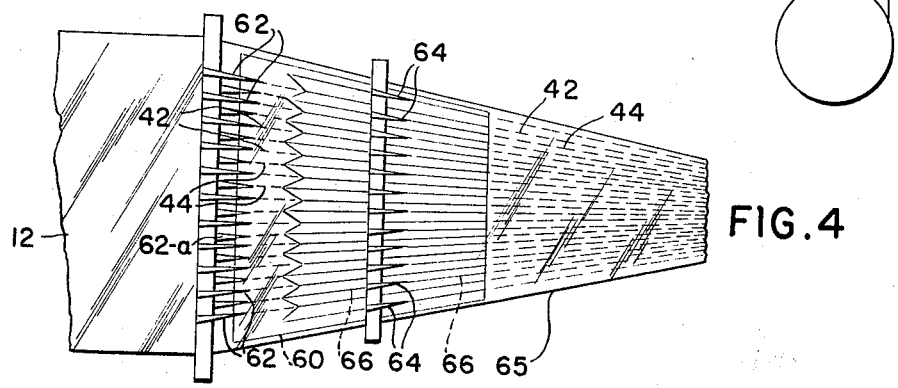
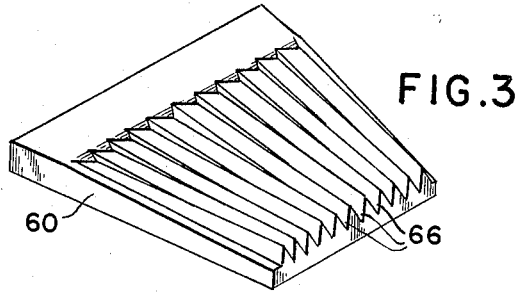
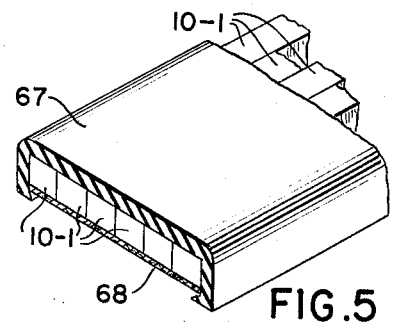
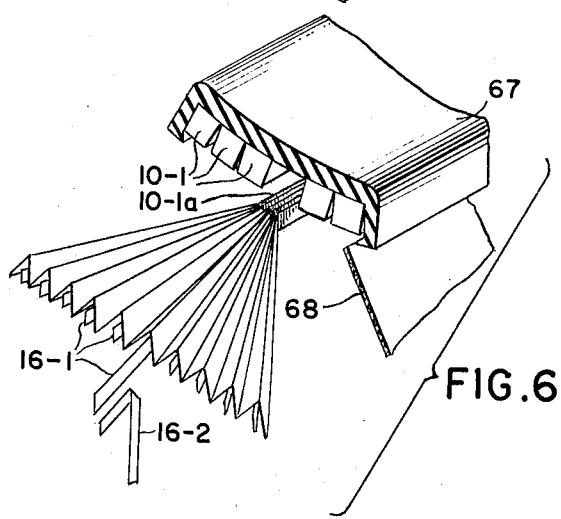
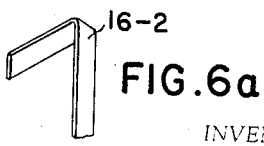
INVENTOR.
RALPH R. BATCHER
BY
ATTORNEY

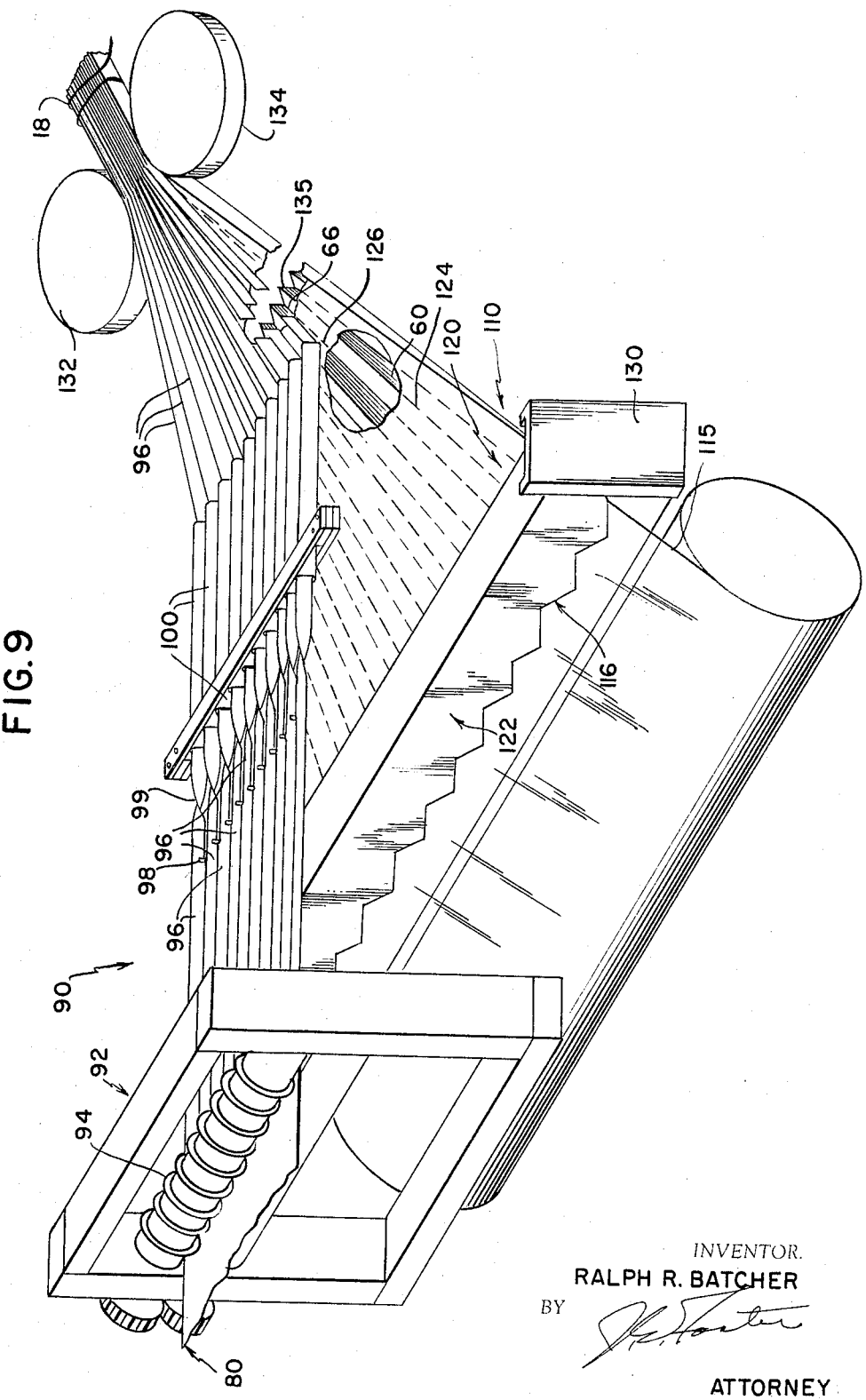

United States Patent Office 3,286,017
Patented Nov. 15, 1966

3,286,017
MULTIPLE CONDUCTOR CABLE AND METHOD
OF MAKING IT
Ralph R. Batcher, 240—02 42nd Ave., Douglaston, N.Y.
Filed Mar. 3, 1964, Ser. No. 349,540
10 Claims. (Cl. 174—36)

This invention relates to a multiple conductor cable and to the method of and apparatus for making such a cable.

As electronic equipment gets more complex, the problems of providing suitable inter-circuit connections are multiplied. This invention relates to a new form of interconnection cable that simplifies this situation. The cable of this invention is thin but rugged, so that it can be affixed to a floor or to a wall without undue impediment to traffic, and thus provide a simple means for electrically connecting different circuit assemblies. Being thin, such a cable is flexible and can be disposed to follow irregular paths.

One object of this invention is to provide a cable that can be assembled with any reasonable number of conductors without major changes in the production technique, and which may still be constructed by automatic techniques.

Another object is to provide a cable in which there is negligibly low cross-talk between cable circuits, without noticibly increasing the bulk or the cost of the cable.

Another object of the invention is to provide a cable capable of carrying conducting elements having several different sizes some of which might have many times the cross-sectional area of others in the same cable.

For full utility of a cable, and to simplify making connections, all leads should be marked or coded so that terminals can be placed in correct sequence, at ends of any selected length of cable using common methods. Also, on occasion, certain taps may be required at some intermediate points along the cable. The assembly operations should be such as to accept any one of a variety of insulation materials, that are commonly used as wire insulation media, and of a selected thickness to provide for a range of operating voltages. The construction of the cable should permit use of different conductor materials, inexpensive and light in weight compared with current formations. The construction should be capable of assembly using a substantial amount of automation, to insure complete interchangeability and constancy of characteristics in different portions of the cable.

To achieve these objectives requires the combination of several expedients. The use of flat ribbons contributes several advantages. Flat ribbons provide the maximum conductor area with no loss of cable volume, such as is found with round wire conductors. Flat ribbons greatly increase the flexibility of the assembly, and permit easy application of terminal connections. However, the use of flat conductors has heretofore presented difficulties using the assembly techniques current in this field. One such difficulty has been the application of inter-conductor insulation. Inter-conductor shielding has been impracticable, and prevented the use of certain types of insulation which were often deemed useful for some applications. The introduction of shielding to the wires, or to pairs of wires in previous methods of construction moreover made the identification or coding of the conductors difficult, since such code information was obscured by the shielding. Further, the use of metallic ribbons as conductors prevents the assembly of cables on existing cabling machines, and requires an entirely new system of production.

The cable of this invention, hereinafter described, utilizes insulating films to separate the conductors. These insulating films are commercially obtainable in any reasonable width and thickness, and in a wide variety of materials, such as Teflon, Mylar, paper, rubber, polyethylene, nylon, and others, some of these being the trade names of common insulating films. The insulating film selected is then shaped and positioned to be interleaved between the metallic conductors which are positioned in a stacked array with conductors in parallel planes with the insulating film. The insulating film is shaped into a pleated strip with the conductors inserted in the folds of the pleats from one side. In this manner, there are two layers of insulation between each conductor. The conductors have a width less than the side walls of a pleated fold, to assure complete encirclement of each conductor by insulation. The pleated insulating material may consist of any desired form of insulating material, preferably but not necessarily, of a type that may be creased and pleated with either the use of pressure or heat, or both, and which will thereafter retain some of this forming. However, completely flexible plastics may also be used since their passage may be made over a pleat-forming guide and the plastics forced down with suitable fingers or by blasts of air into the guide, which will then keep the plastic in a pleated conformation until the conductive copper ribbons are inserted and the assembly closed and spirally bound.

By coating the obverse side of the insulating film with a thin layer of a metallic film, as by evaporation, by plating, or by other methods of deposition, this metallic conductive coating is found to provide a suitable electro-static shield for every conductor, since the insulating film when so pleated provides a grounded metallic coating completely surrounding each conductor.

The insulating film initially is a wide ribbon, as much as twenty-five or more times the width of a conductive ribbon, such being sufficient to provide separating insulation for a ten conductor cable.

The flat conductors may be arranged in various ways in the ultimate cable. They may be disposed in surface-facing arrangement, or in co-planar edge-facing arrangement, or in alternate eschelon arrangement, or in various other arrangements in a group of fixed number, such as ten, for example. Any number of such groups may then be assembled together into a single cable.

Various other arrangements may also be made in which a plurality of flat conductors may be disposed in different quantities in different fold pockets for various conductive capabilities, or conductors of different characteristics may be employed, such as, for example, of resistive or of magneto-strictive material for introducing time delays in selected conductors. Further references to such variations will be made at appropriate places in the specification.

Thus, it has been found to be convenient to make up cables having a greater array of conductors by mounting two or more ten-conductor cables side by side within a single outer sheath, the latter being of a tough, flexible material sufficient to withstand mechanical wear and to provide protection. This method of making up cables using decade-sub-assemblies provides an easy method of coding each conductor, since the conductors are held in exact parallel arrays, and it is easy to pick out any individual conductor in each decade, and to select a particular decade by simple numerical counting. The decade assembly can be formed in long, essentially continuous lengths, and these, being identical, can be assembled in any grouping for cables having a greater number of conductors. Although this sometimes produces a cable having a few extra conductors, more than are actually needed for a particular application, the extra space, and cost, is negligible. However, the principles hereinafter described may be utilized to provide a cable having any reasonable number of conductors in a single pleated form.

Considering typical specifications, it seems that most multiple conductor cable requirements could be satisfied from conductors that are one tenth to one eighth inch wide and from two to five thousands of an inch thick. When a larger conductor is needed, several strands of such ribbons may be connected in parallel at each end, providing greater conductivity without loss of flexibility, and the consistency of the coding is maintained.

The metalized surface of the insulating film, applied to the obverse side of the film from that in which the conductors lay within the folds, is preferably a thin layer of metal possibly only a few microns thick. When long cable lengths are encountered, it is often desirable to insert a flat or round conductor alongside of this metallic film, to reduce the longitudinal resistance of the ground connector, and to simplify the grounding operation when it is installed. If each decade has its own grounding strip it is possible to ground each decade at a different point if this is desired.

To provide compactness, economy, and light weight, it is found that film strips of specified widths and thickness can be obtained in what is possibly the most economical form, and that this film can be subjected to a breakdown test to reveal hidden flaws prior to use. This prevents the use of defective film and simplifies the subsequent post-assembly breakdown testing, especially when it is considered that thicker flm than that actually needed for a given breakdown voltage can be used with but little increase in the cross-sectional area of the cable. Such films can be easily metallized using evaporation or other methods, such forms being items of commercial use in many fields, and being readily available for use in making the cables disclosed herein.

It is found that parallel ribbons are much more compact and flexible than round wires of the same conductivity. A cable having several parallel "decades" of conductors, each of which has been given a wrap of cotton floss or other wrappings is likewise flexible, since this floss acts as buffer between the decades, and equalizes the strains of bending in one direction. It is also found that the conductors being free to move up and down a small amount each within their own folds are likewise flexible, if the bending is not great enough to cause them to rise above the top of the fold. Thus, a completed cable having a number of decades of conductors is quite free to be bent in either or both of two planes. Such a multiple conductor cable may be made to be small and only of the order of one-fourth of an inch thick if a very thin, flexible cable is needed. If cemented to a floor between various equipment consoles, such as parts of an electric computer, it is usually possible to eliminate the false floor, beneath which cable "runs" are now common practice.

Since the conductor ribbons are not coated with enamel or other surface insulations, the application of terminal strips or jacks can be handled by welding, soldering or pressure contacts using simple means for clamping each decade at points just beyond where a connection must be made, and then cutting through the strands of the cotton wrap that keeps the folded pleat tightly bound. All conductors within that particular unit are thus exposed and any or all can be attached to terminals or other types of conductors directly. The pleats are then retightened back as much as required. This technique is found to be applicable also for making side connections at intermediate points, other than the ends of the cable section.

It is found that the metallic ribbons can be used from reels carrying ribbons of desired width, or can be fabricated from wider ribbon stock by slitting directly before insertion within the folds, or the metallic ribbons can be formed prior to insertion by rolling round wires into ribbons of required thickness and width.

The method of forming the various modifications of the cable of this invention, and the constructions of those modifications, and one form of apparatus for assembling a cable, are described in the following specification, taken in connection with the accompanying drawings, in which FIGURE 1 is a schematic perspective view of a cable consisting of a plurality of conducting ribbon strips supported within the pockets of a pleated insulating sheet or film, in accordance with the invention, and shown in expanded form for greater clarity;

FIGURE 2a is a schematic sectional view of a portion of a cable embodying the invention, disposed in flat form with the ribbon conducting strips disposed substantially co-planar within the insulating support;

FIGURE 2b is a similar schematic sectional and perspective view of a portion of a cable of different form embodying the invention, with the conducting strips in shorter pockets but in a substantially flat support with cover flaps to hold the support closed;

FIGURE 3 is a perspective view of a mold for shaping and forming a flat sheet of insulating film material into a pleated structure for supporting the flat conductors in the pleated pockets;

FIGURE 4 is a plan view showing how a sheet of the insulating film is scored and shaped into pleated form by appropriate pressure elements;

FIGURE 5 is a sectional view of a cable provided with several decade units, each of which has ten conductors in its pleated support;

FIGURE 6 is a schematic perspective showing how one decade unit may be removed from the cable of FIGURE 5 to permit access to a selected conductor to permit a terminal connection to be made to such selected conductor;

FIGURE 6a is a plan view of a ribbon strip terminal to be applied to the selected conductor of FIGURE 6;

FIGURE 7 is a schematic view showing how a round wire may be rolled into a flattened ribbon for use in the cable of this invention;

FIGURE 8 is a schematic view of a slitting arrangement for slitting a sheet ribbon into several ribbon strips to serve as flat conductors for the cable herein;

FIGURE 9 shows schematically and functionally, a cable-forming apparatus in which the pleated support is formed and a metallic ribbon sheet is slitted to provide the flat conductors to be inserted into the pleated support as a basic cable unit;

FIGURE 10 is a functional block diagram showing the operating functions of the apparatus in FIGURE 9.

As shown in FIGURE 1, a portion of a cable 10, constructed in accordance with this invention, is schematically illustrated as comprising a pleated support 12 of insulating film material, in pleated arrangement and form, shaped to provide a plurality of upper pockets 14 within which are respectively disposed individual conducting ribbon strips 16, of conducting material such as copper, with suitable binding means 18 wrapped around the cable 10 to hold the pleated support 12 and the conductors 16 in closely packed and coupled relationship, after they are thus so placed in the support pockets.

In one size of a cable formed as in FIGURE 1, the copper ribbon strip 16 is as small as 0.070 inch wide and the depth of the slot or pocket 14 is 0.125 inch deep. A decade unit, with ten conductor strips in the support and closely bound, would thus have a cross-sectional area not much more than one-eighth of an inch in each direction.

As already mentioned above, the pleated insulating material may consist of any insulating material, preferably but not necessarily of a type that may be creased and pleated with suitable pressure and heat, so as to retain such pleated form, into which it is shaped from a sheet that was originally flat, for example.

In many applications it is desirable to establish electrostatic shielding between conductors of a cable. A feature of this invention is the establishing of such shielding by the provision of a metallized layer on the under surface 12–a of the insulating film material of which the pleated support 12 is formed. A suitable grounding connection may be made at any convenient point of such metallic surface, for example, near one end, where terminals are connected to the ends of the main conductor 16.

As a variation, to provide a low-resistance grounding connection, one or more auxiliary conductors 16–a may be placed in contact with the metallic under surface 12–a along all or part of the length of the cable, in one or more of the under pockets 14–a of the pleated support 12.

While FIGURE 1 indicates a common method of assembly that will fill the requirements of most general applications for which multiple conductor cables are needed, there are other variations that may be considered. In the cable shown in FIGURE 1, the valleys 22 between the ridges 24 of the pleated film are centrally spaced so that the copper strips 16 are all positioned face-to-face with intermediate insulating barriers. If the pleats are formed so that the valley creases are not intermediate between the creases that form the ridges, this face-to-face relationship may be shifted, as desired. If, for example, the valley creases are positioned about one-quarter of the distance allotted between adjacent ridge creases, a formation such as in FIGURE 2a is obtained, where the conductors of a decade are ultimately located in a single plane. Here, as before, if the insulating film is metallized on the surface opposite to that carrying the conductors, all those conductors are individually shielded from each other.

By proper selection of distances between the successive fold lines 42 and 44 along the film, with respect to the width of the copper ribbons, intermediate types of arrays are obtained, such as in FIGURE 2b, where the edges of the conductors overlap with their neighboring conductors, but still have the required interconductor insulation, and the shielding layer is effective as before. By still another set of spacings between the ridges produced in the insulating support by the forming head, and by use of an appropriately shaped forming head, the conductors can be made to end up as groups of paired conductors. Extremely versatile arrays of the insulating support and the conductors can thus be made by adjustments on the forming section of the pleating head on a fabricating machine of the type herein described, to locate the scoring lines for determining the shape of the insulating support.

Returning to FIGURE 2a, a further feature is there shown in the two side flaps 26 and 28, which provide additional overlay and protective covers for the individual pocket portions 30 containing the several conductors 16. The two side flaps 26 and 28 provide a certain amount of stiffening to hold the pocket portions in place against unwanted casual displacement or separation. Also, the outer or exposed surface of flap 26 carries the metallized layer 26–a, thereby providing easy access for a grounding connection to such layer 26–a, as by means of one or more grounding conductors 55.

In FIGURE 2b, similarly, the assembly unit 10B is provided with two flaps 36 and 38, which help to hold the pockets closed and to prevent spreading. Here, also, the metallic surface 36–a of one flap 36 is exposed and available for easy grounding over a larger surface area, as by an auxiliary conductor 55.

The conductor arrangement and disposition shown in unit 10B in FIGURE 2b serves to illustrate the flexibility of the method of the present invention, in forming and arranging the pockets 40 of the insulating support to hold the conductors 16 in various desired arrangements. The pockets, their sizes and dispositions, are predetermined by appropriately disposing the top and bottom scoring lines 42 and 44 on the insulating sheet 46 that is to constitute the support. Here, again, end flaps 48 and 50 may be utilized as covers to hold the pockets together as a decade unit for individual wrapping or for group assembling with other similar decade units in a multi-decade cable assembly. The outer surface of flap 48 provides the metallized surface for grounding.

In any of the arrangements shown in FIGURES 2a and 2b, an auxiliary conductor 55 may be utilized along the length of the cable to provide a low-resistance grounding connection.

The single sheet of insulating film material 12 of FIGURE 1 may be formed to be progressively pleated as the sheet is drawn along and pressed into a suitably formed block 60, as shown in FIGURES 3 and 4, to form the grooves or pockets 14 in the finally pleated formation.

In FIGURE 4 is shown a schematic view illustrating how the insulating film is scored by crease formers 62 before being moved forward across the top of the formed pleater block 60 into which other suitable fingers 64 press the film material into the tapered, gradually-deepened grooves 66, which progressively form the pleating operation so the pleated sheet will ultimately exit from the pleater block 60 as a fully pleated film 65, into which the flat copper ribbons 16 are introduced as individual conductors to achieve the desired distribution for the final cable.

By means of similar pleating blocks and scoring fingers, appropriately shaped and disposed, the insulating material sheets may be formed into supports 12 of the several forms and shapes shown in FIGURES 1 and 2, or of any other desired form and shape.

With the various arrangements shown in FIGURES 1 to 2b, or in any other arrangements that may be desired, the conductors and the insulating film supports can be arranged to provide an assembly of a decade, or ten conductors, in one assembly unit, and several such assembly units may be combined as a multi-decade cable, with the decades laterally positioned or arranged to permit ready identification of the respective decades and of the individual conductors contained in each decade, so that any desired conductor may be easily and quickly located and identified for any desired subsequent electrical connections thereto.

One simple arrangement for a multi-decade cable assembly is shown in FIGURE 5, where several decade units 10–1, of the kind shown in FIGURE 1, for example, are assembled within a single cover or shell 67, and held in the shell, against casual displacement, by a retainer wedge 68. The shell and the retainer wedge are both preferably of a tough abrasion resistant rubberlike material, to resist wear and scuffing.

With the arrangement shown in FIGURE 5, it will be clear that upon removal of the retainer wedge, free and simple access is available to any one of the decade units, such as unit 10–1a in FIGURE 6, which can be removed and then such decade unit may be manipulated from compressed condition to open condition, to separate the pocket-forming walls to permit access to any selected conductor, such as 16–1, of such selected decade unit 10–1a, for testing or checking, or for providing a terminal connection 16–2 of FIGURE 6a to such selected conductor 16–1 in FIGURE 6.

The flat narrow ribbons or strip conductors 16 may be formed, in one way, by rolling round wire stock 70 by rolls 72 into flat ribbon 74, as shown in FIGURE 7, which may then be collected on a reel, or as shown in FIGURE 7, immediately directed into a suitable flattened tubular guide 75 for guided insertion into a pleated support of the type formed in FIGURE 4, or its equivalent, as shown in the various arrangements in FIGURE 2.

An alternative method of forming strip conductors is shown in FIGURE 8, in which a sheet ribbon 80 of conductive material, such as copper for example, is slitted by suitable slitting wheels 82 to form narrow strips 84 to serve as conductors to be directed by suitable guides 86 into a pleated support 88, such as shown in FIGURES 1 and 2 as support 12.

In FIGURE 9 is shown one form of cable-forming mechanism 90 for forming an edge-wise ribbon-type cable of the types illustrated in FIGURES 1 and 2. As shown in FIGURE 9, the cable-forming mechanism 90 comprises a slitter 92 with a gang of slitting wheel knives 94, for slitting a sheet of copper 80 into individual narrow strip conductors 96; a set of individual flattened hollow tubes 100 designed to pass the conductor strips and which serve as individual guides for these strips; a crimping head 110 with suitable guides which first score the insulating film 115 by heat or pressure elements or both; a pleated forming structure 120 that serves to fold the scored insulating film 115, to define the individual pockets, as the film 115 is progressively moved forward to a position where the pockets receive the individual copper ribbon strips from the flattened guide tubes 100.

After emerging from the crimping or pleating form 120, with the conductors 96 positioned in the valleys of the succession of pleats, the array of pleated support and included conductors is further consolidated by being drawn between the rollers of two motor-driven capstans 132 and 134, which also act to pull the insulating film, moving through the pleat-forming section, and the received array of conductor ribbons, at common speed. upon emerging from the capstan rollers, the formed array can be spiral-wound with a serving of thread or floss to maintain the assembly in a closely bound relation. This assembly can then either be collected onto a reel for storage until it can be combined into a prescribed cable, possibly along with additional decades, or it can be transported to a cutting station where it will be cut into prescribed lengths.

The functional operation of the system of mechanism shown in FIGURE 9 may be understood upon reference to the functional block diagram shown in FIGURE 10. As shown in FIGURE 10, a copper sheet 150 is fed into the metal slitter 92 whose knives 94 slit the metal sheet 150 into narrower individual conducting ribbons 96 that are individually directed into the flattened hollow tubes 100, which separate the individual ribbons 96 and guide them in proper alignment into the pleated preform and pleated insulating film 115.

At the same time that the sheet metal is being fed into the slitter and the ribbons are formed and guided through the flat hollow tubing guides, the insulating film 115 is fed as a wide flat strip in a path beneath the copper sheet that is moving through the slitting rolls.

In the placement of this film 115, the metallized surface is underneath if a shielded formation of cable conductors is wanted. In this lower path the film 115 passes through the crimping head and receives longitudinal scorings which enables such film to be readily folded into pleats as it passes onto and over the surface of the pleat-forming guide 120. The copper ribbons 96 are guided into the channels in the film 115, so formed, before the folding of the pleats is completed. Such guidance of the copper ribbons 96 is accomplished by the use of an equal number of flat, hollow tubes 100 having inside dimensions somewhat larger than the width and thickness of a ribbon, so that each ribbon is free to slip through the bore in its tube. These guidance tubes 100 can also act as fingers that force the film 115 down into the folds of the pleat-forming guide 120, thereby injecting the copper ribbons into the valleys of the pleats immediately before the folds close together over them.

The pulling force on the array is produced by motor driven capstans 132 and 134 which thus act on drawing the film and the enclosed copper ribbons from their sources at the same speed. When the array emerges from the capstan rolls it is desirable that a spiral wrap of thread or floss be applied immediately so that the relative positions of the coppers ribbons and the pleated form be maintained through subsequent handling operations. The form may then be enclosed in a protective sheath, or cut to lengths as needed, for possible assembly into larger cables having several of these sub-units within such a common protection sheath, or may be stored on collection reels for subsequent formation into final cables at some other time. In the usual application, one or more of these sub-assemblies each having preferably, though not necessarily, ten conductors will be mounted side by side within a suitable protective outer sheath, this sheath being extruded around the array of sub-cables, or being of a U-shaped formation within which the cable units are implanted and sealed, as in the form shown in FIGURE 5.

While the foregoing descriptions disclose the use of a single layer of insulative material, it is found that two or more parallel layers of the same or different materials may be included for enhancing higher electrial breakdown, lowering capacitance effects or adding supplementary insulation that withstands higher temperatures or changing still other attributes. Such supplementary films, drawn from separate rolls can be separately scored if their physical characteristics will retain such scorings, and combined on a common pleating form just prior to the injection point of the conductors. When more than one layer of insulation is included, only one sheet, that most distant from the conductive strips, need be metallized for shielding purposes.

Reviewing the drawings, briefly, FIGURE 1 shows a section of a basic cable unit in expanded form, with a conductor 16 in each upper pocket, and with a grounding conductor 16-a in a lower pocket 14-a to engage the metalized surface 12-a to provide a low-resistance ground. The binding means 18 is any suitable insulating twine to hold the cable pockets closed in the final form, while permitting loosening to permit expansion of the pleated structure to provide access to any desired conductor for any operating purpose. Where such access is not likely to be desired, the compact cable may be covered as one unit, or with others in assembly, as in FIGURES 5 and 6, or the cable unit may be completely enclosed in an extruded covering.

The pleating form 60 in FIGURE 3, and indicated in FIGURE 4 with line scoring devices and pressure fingers, may have other forms to determine a different spacing between the top edges of the pleat and the location of the valley lines to control the form of the final pleated support for a cable unit, as for example, in FIGURES 2, 2b or the like. Scoring devices 62 and 62-a may be disposed above and under the sheet 12 to locate the fold lines as wanted in the final pleated form.

FIGURE 9 shows schematically the functional arrangement of means for preparing the conductors and the pleated form for receiving them. The sheet 115 is flat as it enters a crimping head 116 in the frame 122 between the end walls 130 and moves over the back of the pleater 120, similar to that shown in FIGURE 3, and the peak and valley lines 124 and 126 are appropriately scored on the sheet. The valley grooves 126 gradually incline downwards to the full depth desired at the outlet or front end to fix the depth of pockets needed. The conductors 96 are utilized to serve as pressure fingers to press the film scored valley lines 126 downward into the form just beyond the end of the form at 135. The conductors 96 where they exit from the guide tubes 100, are directed downward and at an angle so they can bend and press downwardly into the pockets of the pleated structure.

Where the conductors 96 are formed by the slitting operation, they may be passed through a comb 98 to smoothen the edges before being fed into the guide tubes 100. Since the tubes 100 are disposed with their long sectional dimension vertical, to guide the conductors vertically into the pockets of the pleated form, the slitted ribbons 96 are given a quarter-turn just before entering the guide tubes 100. This is similarly shown in FIGURE 8.

After the cable is pulled out between the two capstan rolls 132 and 134, the floss 18 may be applied to hold the pleated form compressed while it is being collected or otherwise processed.

What is claimed is:

1. A multi-conductor cable comprising
   a sheet of insulating film material folded into pleated form to proivde a plurality of parallel pockets between folds of predetermined depth;
   and a plurality of electrically conductive elongate ribbons disposed respectively one in each pocket and insulated from each other by the film material.

2. A multi-conductor cable, as in claim 1, in which the depth of each side of each fold of said film material exceeds the width of each conductive ribbon disposed edgewise in the pocket between the sidewalls of each fold, whereby the top border edges of the sides of each fold engage to cause the film material to substantially encircle the respective conductive ribbons in the several pockets and to insulate said ribbons from each other.

3. A multi-conductor cable, as in claim 1, in which
   the film material is parallel accordion pleated to cause the pockets to be sidewise parallel.

4. A multi-conductor cable, as in claim 1, in which
   the film material is series folded to form a series of folds to cause the pockets and the ribbons to be substantially co-planar and edgewise parallel.

5. A multi-conductor cable, as in claim 1, in which
   the film material is folded to arrange successive folds in staggered echelon disposition, to position the ribbons in similar staggered echelon arrangement.

6. A multi-conductor cable, as in claim 1, in which
   said insulating film material is metallized with a film of conducting metal on the surface opposite the surface engaging the conductive ribbons, to provide inter-conductor electrostatic shielding.

7. A multi-conductor cable, as in claim 1, including
   a spiral wrapping around the outer periphery of the interleaved assembly of the pleated sheet of insulating film material and the enfolded conductive ribbons.

8. A multi-conductor cable, as in claim 7, including
   an outer sheath of tough insulating armor for mechanical protection of the cable.

9. A multi-conductor cable, comprising
   a plurality of individual wrapped assemblies, each as individually defined in claim 7, all disposed in close physical relationship;
   and means wrapped around all of said assemblies together as a unit.

10. The method of forming a multi-conductor cable from a ribbon strip of insulating material and plurality of conductors, which method comprises the steps of
    (1) shaping the strip of insulating material into a pleated formation having a plurality of pockets each having a depth in excess of a predetermined dimension;
    (2) inserting a conductor into each pocket, each such conductor having a maximum width not greater than said predetermined dimension;
    (3) compressing said pleated strip to confine said conductors; and
    (4) wrapping said pleated strip to hold said pleated strip closed and thereby to hold said conductors confined in place against unwanted displacement.

References Cited by the Examiner

UNITED STATES PATENTS

| | | | |
|---|---|---|---|
| 1,784,217 | 12/1930 | Berry | 174—117 |
| 2,158,867 | 5/1939 | Schwabacher | 174—117 |
| 2,873,965 | 2/1959 | Mitchell | 270—40 |
| 3,038,718 | 6/1962 | Balsam | 270—40 |

FOREIGN PATENTS 1,279,576  11/1961  France.

LEWIS H. MYERS, *Primary Examiner.*

JOHN F. BURNS, *Examiner.*

D. A. KETTLESTRINGS, *Assistant Examiner.*